United States Patent
De Haseth et al.

(10) Patent No.: US 12,221,084 B2
(45) Date of Patent: Feb. 11, 2025

(54) MONITORING A MACHINE'S BRAKE PERFORMANCE

(71) Applicant: Caterpillar SARL, Geneva (CH)

(72) Inventors: Andrew De Haseth, Peterborough (GB); Shinya Sono, Peoria, IL (US); Ian Macdonald, Peoria, IL (US); Rodney Menold, Peoria, IL (US); Timothy Schwartz, Peoria, IL (US)

(73) Assignee: Caterpillar SARL, Geneva (CH)

( * ) Notice: Subject to any disclaimer, the term of this patent is extended or adjusted under 35 U.S.C. 154(b) by 532 days.

(21) Appl. No.: 17/296,376

(22) PCT Filed: Nov. 21, 2019

(86) PCT No.: PCT/EP2019/025411
§ 371 (c)(1),
(2) Date: May 24, 2021

(87) PCT Pub. No.: WO2020/104066
PCT Pub. Date: May 28, 2020

(65) Prior Publication Data
US 2022/0017060 A1 Jan. 20, 2022

(30) Foreign Application Priority Data

Nov. 23, 2018 (GB) .................... 1819078

(51) Int. Cl.
*B60T 17/22* (2006.01)
*B60T 7/12* (2006.01)
*G07C 5/02* (2006.01)

(52) U.S. Cl.
CPC .............. *B60T 17/221* (2013.01); *B60T 7/12* (2013.01); *G07C 5/02* (2013.01); *B60T 2220/04* (2013.01);
(Continued)

(58) Field of Classification Search
CPC ........ B60T 17/00; B60T 7/00; B60T 2220/00; B60T 2240/00; B60T 2250/00;
(Continued)

(56) References Cited

U.S. PATENT DOCUMENTS 3,858,696 A * 1/1975 Shore .................. F16H 61/0272
192/221
4,567,757 A * 2/1986 Melocik .................... G01L 5/28
701/70
(Continued)

FOREIGN PATENT DOCUMENTS

CN 2032163 U 2/1989
CN 101722950 6/2010
(Continued)

OTHER PUBLICATIONS

UK Search Report related to GB Application No. GB1819078.5 reported on Apr. 18, 2019.
(Continued)

*Primary Examiner* — Andrew R Dyer
*Assistant Examiner* — Elizabeth J Slowik

(57) ABSTRACT

Monitoring the brake performance of a brake system of a machine (vehicle 11) by determining a brake delay between input of a request for a brake engagement of the brake system and brake system effectuating the brake engagement. The brake delay determination provides for capturing delay produced by communication of the input from a brake input, actuation of an input to brake system performance, processing of operation of the brake system, and operation of the brake/retardation components of the brake system with respect to the machine's wheels. For autonomous machines, brake delay may be measured periodically and used in monitoring brake system performance.

19 Claims, 5 Drawing Sheets

(52) U.S. Cl.
CPC ....... *B60T 2240/00* (2013.01); *B60T 2250/00* (2013.01); *B60T 2270/406* (2013.01); *B60T 2270/88* (2013.01)

(58) Field of Classification Search
CPC ....... B60T 2270/00; B60T 13/00; G07C 5/00; G01L 5/00
See application file for complete search history.

(56) References Cited

U.S. PATENT DOCUMENTS

| | | | |
|---|---|---|---|
| 5,299,452 A * | 4/1994 | Caron | G01L 5/28 |
| | | | 701/70 |
| 5,535,122 A | 7/1996 | Wood et al. | |
| 5,892,437 A * | 4/1999 | Scheibe | F16D 66/021 |
| | | | 73/132 |
| 6,332,354 B1* | 12/2001 | Lalor | G01L 5/28 |
| | | | 73/121 |
| 7,720,585 B2 | 5/2010 | Fukuda | |
| 2006/0284481 A1 | 12/2006 | Yone | |
| 2014/0277964 A1 | 9/2014 | Rikkola | |
| 2015/0088371 A1* | 3/2015 | Kanemori | B64C 25/42 |
| | | | 701/33.9 |
| 2016/0214582 A1* | 7/2016 | Brenn | B60T 7/042 |
| 2017/0036677 A1 | 2/2017 | Blumentritt | |
| 2017/0137003 A1 | 5/2017 | Grandstaff | |
| 2017/0345229 A1* | 11/2017 | Huang | B60T 17/22 |
| 2018/0024019 A1* | 1/2018 | Schagerl | G01L 5/28 |
| | | | 434/69 |
| 2018/0056985 A1* | 3/2018 | Coulter | B60L 50/52 |
| 2018/0065629 A1* | 3/2018 | Wolff | B60W 30/18009 |
| 2018/0178798 A1* | 6/2018 | Peterson | B60W 50/00 |
| 2018/0201241 A1* | 7/2018 | Takae | B60T 8/245 |
| 2018/0319380 A1* | 11/2018 | Laine | B60W 10/184 |
| 2018/0319483 A1 | 11/2018 | Mayer | |
| 2019/0084540 A1* | 3/2019 | Kasper | B60T 8/176 |
| 2019/0092308 A1 | 3/2019 | Graves | |
| 2019/0206261 A1* | 7/2019 | Szymczak | B60W 30/16 |
| 2020/0146908 A1* | 5/2020 | Harrison | F16D 65/14 |
| 2020/0324748 A1* | 10/2020 | Hiraga | B60T 7/22 |

FOREIGN PATENT DOCUMENTS

| | | |
|---|---|---|
| CN | 102529732 | 7/2012 |
| CN | 106240549 | 12/2016 |
| DE | 10154633 A1 | 5/2003 |
| EP | 1522480 A2 | 4/2005 |

OTHER PUBLICATIONS

International Search Report related to PCT Application No. PCT/EP2019/025411 reported on Feb. 18, 2020.

* cited by examiner

MONITORING A MACHINE'S BRAKE PERFORMANCE

This patent application is a 35 USC § 371 U.S. national stage of International Application No. PCT/EP2019/025411 filed on Nov. 21, 2019, which claims the benefit and priority of Great Britain Application No. 1819078.5 filed on Nov. 23, 2018 the disclosures of which are incorporated in their entirety by reference herein.

BACKGROUND

The present disclosure relates to a method of monitoring the brake performance of a machine and a system for performing such a method.

Brake systems of machines are typically configured to provide a predetermined brake performance. The predetermined brake performance may, for example, be a measure of the distance and/or time required by the brake system to bring a machine from a predetermined speed to a halt. Machines are typically required to meet certain standards of braking performance based upon certain conditions, such as when braking on a certain inclination, when the machine has a certain load and the like. Such machines may include hauling machines, such as dump trucks, off-highway trucks, on-highway lorries/trucks, mining trucks, articulated haulers, earth-moving machines, such as backhoes, loaders, dozers, shovels, motor graders, wheel tractor scrapers, excavators and other such vehicles.

It may be desirable to continuously monitor the brake performance of a brake system during its operation and over time. A common approach is to perform visual, static checks on the brake system to determine whether it meets certain criteria, such as a predetermined brake pad wear or the like. Alternatively, U.S. Pat. No. 6,332,354 discloses determining the effectiveness of a vehicle braking system. Vehicle mass is manually or automatically measured, brake system pressure is measured during deceleration of the vehicle, road slope is measured and air friction and engine friction of the vehicle is measured. A predicted deceleration of the vehicle is calculated based upon data representing these parameters under comparable circumstances. Brake effectiveness is calculated using the predicted deceleration and a measured actual deceleration. However, further improvements may be required to improve the accuracy and reliability of brake performance determinations.

SUMMARY

The present disclosure provides method of monitoring brake performance of a brake system of a machine. Initially, an input is provided to the brake system and the brake system is activated/engages in response to the input. A brake delay is then processed, where the brake delay is a time-period between the input and the brake engagement. The brake delay is processed to determine how the brake system is performing. The processed brake delay may be used to provide an alert, schedule maintenance, alter operation of the machine and/or the like.

The present disclosure further provides a system comprising a machine that includes a brake system and a control system for monitoring the brake performance of the brake system. The control system detects an input to the brake system that initiates operation of the brake system to engage. The control system determines occurrence of the brake engagement of the brake system in response to the input and processes a brake delay as the time-period between the input and the brake engagement. The control system uses the brake delay to operate the machine, schedule brake maintenance, provide an alert to an operator of the machine and/or the like.

In embodiments of the present disclosure, the brake delay is determined from an input to the braking system through to brake engagement. In a manually operated machine, the input may include, depression of a brake pedal. Movement of a joystick, an interaction of an operator with an interface, such as a button touch screen or the like or other user interaction. In autonomous vehicles, the input to the braking system, the input may comprise an input signal, electrical, optical and/or the like, to the brake system.

In embodiments of the present disclosure, by defining the brake delay as commencing with the input to the brake system, the brake delay takes account of operation of the whole of the brake system. For example, with a physical input device, such as a joystick, brake pedal or the like, the joystick brake pedal may be mechanically, hydraulically, electrically coupled with the brake system and performance of this coupling is captured in the brake delay. Where a physical input device is electronically coupled to the brake system or where the input is an electrical input, such as in an automated machine, an actuator may be necessary to couple the input to the brake system to provide for brake engagement. In such aspects, by defining the brake delay using input to the brake system, the operation of the actuator is captured. In addition, by defining the brake delay using input to the brake system, operation of communication means between the input device and the brake system, such as a hydraulic line, gas line, electronic signal communication line/system, is captured in the brake delay.

In embodiments of the present disclosure where the machine is an autonomous machine, brake delay testing may be performed periodically to monitor the brake system of the autonomous machine. In some embodiments, a brake test may be performed after a machine has been in use for a period-of-time and may be performed after set periods of time, after set amounts of brake engagements and or the like. In some embodiments, the brake delay may be a time-period between an input to the brake system and engagement of the brake system, where engagement of the brake system may be detected by a sensor monitoring positioning a brake pad or the like, deceleration of rotation of the wheels, deceleration of the machine and/or the like. By using engagement of the brake system as an end-point of the brake delay, in some embodiments of the present disclosure, it is not required to bring the machine to a complete or near complete stop, reducing wear and tear on the system and the time required for a brake system test.

The present disclosure provides a computer readable medium storing computer executed instructions for performing the method set out in the present disclosure. The method of the present disclosure may comprise operating the control system to perform the method.

BRIEF DESCRIPTION OF THE DRAWINGS

By way of example only, embodiments of a method and system of the present disclosure are now described with reference to, and as shown in, the accompanying drawings, in which.

DETAILED DESCRIPTION

Figure 1:
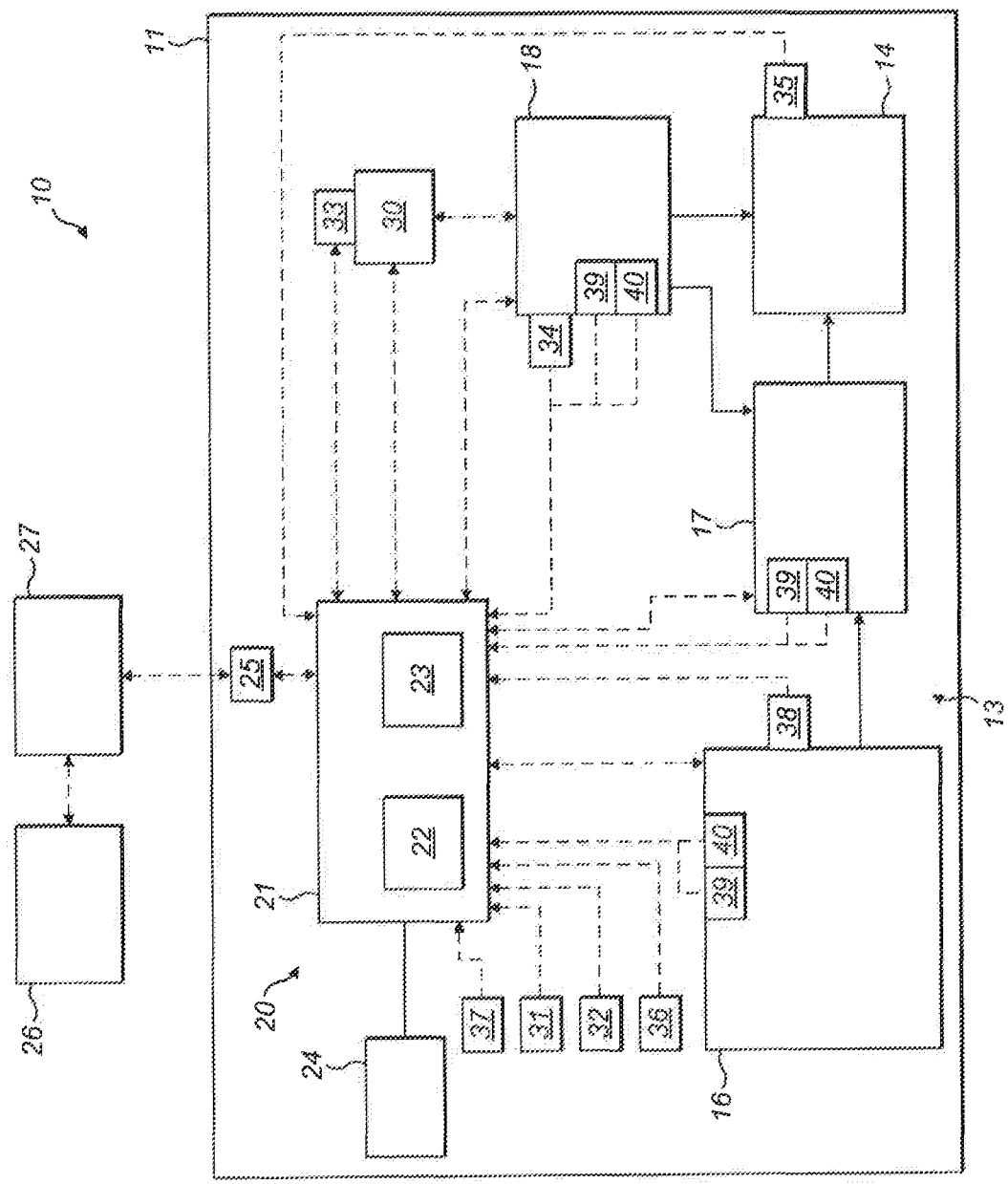
FIG. 1 is a schematic representation of an embodiment of a system according to the present disclosure.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements, including combinations of features from different embodiments, without departing from the scope of the invention. Specific details are given in the following description to provide a thorough understanding of the embodiments. However, it will be understood by one of ordinary skill in the art that embodiments may be practised without these specific details. For example, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure generally relates to monitoring the performance of a brake system of a machine and systems comprising control systems configured to perform such methods. The brake performance may be determined based upon a predicted deceleration and a measured deceleration during a brake engagement. The predicted deceleration may take account of the rolling resistance and windage losses of the machine. The brake performance data may be filtered to exclude data resulting from brake engagements in which a skid occurs. The performance may be monitored by identifying substantial changes or increases in rates of change of the brake performance over a longer time-period. The performance may also be assessed and/or analysed further by determining a brake delay between the operator instructing a brake engagement and the brake system actually engaging.

The Applicants have determined that an important factor in monitoring brake performance is brake delay. At lower speeds, the delay between input of a brake engagement 'request' and actual brake engagement may comprise a substantial portion of the stopping time of a machine. In worksite operation of machines and/or in controlled operation of on-road vehicles, machines and vehicles may operate at low speeds around other machines/vehicles and/or pedestrians or workers. In such, operations, brake delay is extremely important for safe machine/vehicle operation.

In embodiments of the present disclosure, brake delay comprises a time-period between an input to the brake system and engagement of the brake system. In embodiments of the present disclosure, by using input to the brake system as a start-point for a measured brake delay, communication of the input from an input device, such as a brake pedal, control system and/or the like is captured in the brake delay. Similarly, in embodiments of the present disclosure using input to the brake system as a starting point for a measured brake delay, response of an actuator to actuate the engagement of the braking system is captured in the determined brake delay. For example, in an autonomous vehicle/machine, in embodiments of the present disclosure, brake delay captures a time-delay between a processor inputting a request for brake engagement of a brake system and engagement of the brake system. In some autonomous systems, the brake system may have intelligence/processing circuitry and process how to perform a brake engagement in response to a brake engagement input, and in embodiments of the present disclosure, the performance of the intelligence/processing circuitry, including its determined performance of the brake engagement, is captured in the brake delay.

Figure 2:
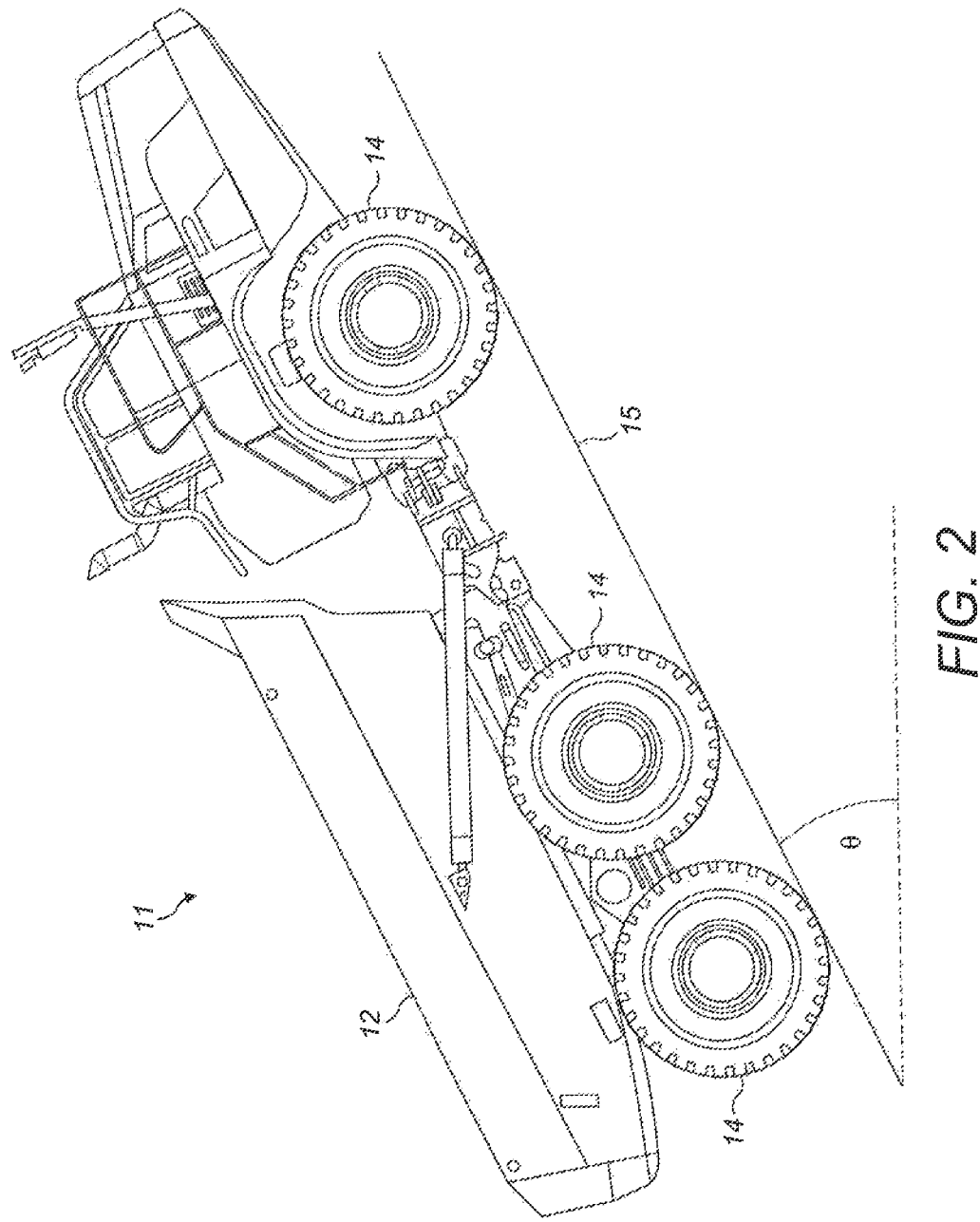
FIG. 2 is a schematic representation of an embodiment a machine of the system of FIG. 1.

FIG. 1 illustrates an embodiment of a system 10 of the present disclosure comprising a machine 11, which is illustrated in further detail in FIG. 2. The machine 11 may be any type of machine or vehicle, such as the illustrated articulated hauler. In other embodiments the machine 11 may comprise any other type of hauling machine or vehicle (i.e. configured predominantly for transporting bulk material), work and/or material handling machine or vehicle (i.e. configured to perform work), such as a dump truck, off-highway truck, on-highway lorry/truck, mining truck, articulated hauler, backhoe, loader, dozer, shovel, wheel tractor scraper, drilling machine, motor grader, forestry machine, excavator and the like. The machine 11 may comprise at least one work tool 12 for performing work, such as a dump body as illustrated, a bucket, shears, a fork, hammer, plow, handling arm, multi-processor, pulveriser, saw, shears, blower, grinder, tiller, compactor, trencher, winch, auger, blade, broom, cutter, planer, delimber, felling head, grapple, mulcher, ripper, rake or the like.

The machine 11 may comprise an engine system 13 configured to drive at least one wheel 14 to move the machine 11 across a terrain 15. The at least one wheel 14 may drive tracks attached thereto or the like. The engine system 13 may comprise at least one power unit 16 (e.g. an internal combustion engine, electric motor and/or hydraulic motor) configured to drive a powertrain 17. The powertrain 17 may comprise at least one transmission, torque converter, transfer gear, output shaft, axle or the like for transferring power from the engine system 13 to drive the at least one wheel 14.

The machine 11 may comprise a brake system 18 for decelerating the machine 11 as it moves across the terrain 15. The brake system 18 may be of any suitable type, such as an air brake system or a hydraulic brake system, and may be configured to selectively apply a braking force to the at least one wheel 14 and/or powertrain 17. The brake system 18 may comprise at least one pad, at least one rotor, at least one drum, at least one piston and/or the like. In the case of an air brake system, it may comprise an air distribution system, including a brake chamber, containing pressurised air for controlling the application of the brake system 18. In addition to the brake system 18, the machine 11 may comprise alternative means for reducing its speed, such as an engine braking system or a hydraulic retarder.

The system 10 may comprise a control system 20, which may be configured to perform the methods of the present disclosure. The control system 20 may comprise a controller 21, which may comprise a memory 22, which may store instructions or algorithms in the form of data, and a processing unit 23, which may be configured to perform operations based upon the instructions. The controller 21 may be of any suitable known type and may comprise an engine control unit (ECU) or the like. The memory 22 may comprise any suitable computer-accessible or non-transitory storage medium for storing computer program instructions, such as RAM, SDRAM, DDR SDRAM, RDRAM, SRAM, ROM, magnetic media, optical media and the like. The processing unit 23 may comprise any suitable processor capable of executing memory-stored instructions, such as a microprocessor, uniprocessor, a multiprocessor and the like. The controller 21 may further comprise a graphics processing unit for rendering objects for viewing on a display 24 of the control system 20. The controller 21 may also be in communication with least one machine communication module 25 for transferring data with an external computing system 26 via a wired or wireless network 27 (such as Ethernet, fibre optic, satellite communication network, broadband communication network, cellular, Bluetooth). The external computing system 26 may comprise computing systems, processors, servers, memories, databases, control systems and the like.

The controller 21 may be communicatively connected (via a wired or wireless connection) to the power unit 16, powertrain 17 and/or brake system 18 for providing control signals thereto and receiving sensor signals therefrom in order to control the operation of the machine 11. The controller 21 may communicate with at least one input device, such as the display 24, a joystick, a button and a brake input 30, for receiving an input and controlling the machine 11.

As illustrated, a brake input 30, which may comprise a brake pedal, may be in communication with the controller 21 and/or brake system 18 for controlling the actuation and engagement of the brake system 18 to decelerate the machine 11. In some embodiments, the input may comprise a joystick, a touchscreen, a signal from a processor and or the like. For example, the machine may comprise an autonomous vehicle and a processor controlling the autonomous vehicle may initiate an input signal to the brake system to engage. In such embodiments, the brake system may comprise an actuator, such as a motor, hydraulic actuator, gas actuator and/or the like that actuates a braking mechanism, such as brake pads, brake calipers and/or the like, in the brake system. In some embodiments, the controller 21 may comprise or be coupled with a processor that determines how the brake system responds to the input. For example, The processor may have a learning capability and may be set to optimize performance of the brake system. In autonomous machines, factors such as surface conditions, temperature, machine operation, machine status, status of brake system and/or brake system components, status of actuators responsive to the input and/or the like may be used in calculations for control of the brake system in response to the input.

The controller 21 may receive operating condition data indicative of at least one operating condition of the machine 11 by being communicatively coupled with at least one sensor and/or with the power unit 16, powertrain 17 and/or brake system 18. The controller 21 may process the received operating condition data to determine further operating condition data and may store the operating condition data on the memory 22. The at least one operating condition and operating condition data may comprise at least one of:

An inclination θ of the machine 11 relative to the direction of the gravitational force (as shown in FIG. 2). The control system 20 may comprise an inclination sensor 31 for determining the inclination θ of the machine 11 on the terrain 15 in two or three dimensions;

A position of the machine 11. The control system 20 may comprise a navigation system 32, for example comprising a position sensor for determining position via a global navigation satellite system, for determining the position of the machine 11;

A brake input 30 actuation, which may include the force applied to the brake input 30. The machine 11 may comprise a brake input sensor 33, which may comprise a pedal position sensor, for determining whether the brake input 30 has been actuated by an operator;

A pressure within the brake system 18, which may be indicative of the engagement of the brake system 18.

The control system 20 may comprise brake system pressure sensor 34 for determining the brake system pressure;

A wheel speed of at least one wheel 14. The control system 20 may comprise at least one wheel speed sensor 35 for determining the wheel speed;

A mass of the machine 11, which may be the load or weight of the machine 11 and any payload being transported by the machine 11. The mass may be input by an operator via at least one input device, stored on the memory 22 and/or estimated based upon a payload estimator 36. The payload estimator 36 may comprise at least one load sensor for detecting the mass of a payload carried by the machine 11;

An acceleration or deceleration of the machine 11. The control system 20 may comprise an inertial measurement unit 37 (IMU) and/or may utilise the wheel speed sensor 35 for determining the acceleration;

A machine speed of the machine 11, which may be determined via the IMU 37, the at least one wheel speed sensor 35, a powertrain speed sensor (such as an engine speed sensor 38) and/or the navigation system 32;

An engine speed, which may be the rotational velocity of at least one output shaft of the at least one power unit 16 of the machine 11. The control system 20 may comprise the engine speed sensor 38 for determining the engine speed;

A transmission ratio of the transmission of the powertrain 17. The transmission ratio may be determined based upon a demanded transmission ratio sent from the controller 21 to the powertrain 17 and/or a transmission ratio sensor within the powertrain 17; and/or Oil temperatures of oil in contact with at least one rotating component of the engine system 13, powertrain 17, or brake system 18 and rotational speeds of at least one rotating component. The oil may be lubricating and/or cooling oil. The control system 20 may comprise at least one oil temperature sensor 39 and at least one engine system component speed sensor 40 for determining the oil temperatures and rotational speeds.

The IMU 37 may comprise the inclination sensor 31. The inclination θ may be determined based upon the outputs of the IMU 37 and at least one wheel speed sensor 35. In particular, the acceleration or deceleration of the at least one wheel 14 may be determined via the at least one wheel speed sensor 35 and the inclination 9 determined by accounting for such acceleration or deceleration of the at least one wheel 14 in the output of the IMU 37.

The operating condition data collected by the control system 20 may be transferred to the external computing system 26, which may perform the method of the present disclosure. Thus the control system 20 may be considered in the present disclosure to comprise the external computing system 26, which may have instructions stored thereon for performing the methods disclosed herein in a similar manner to the controller 21.

Figure 3:
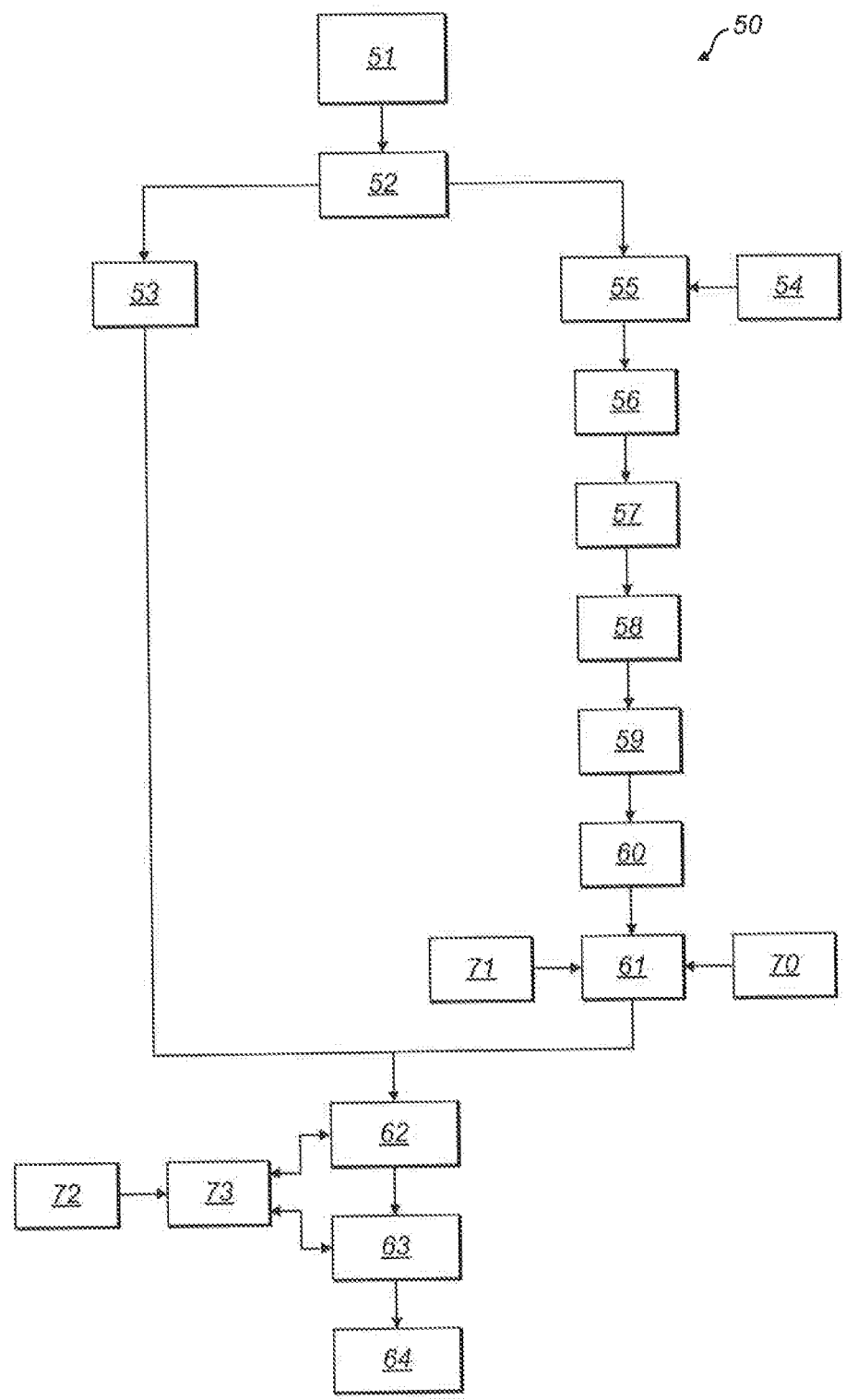
FIG. 3 is a flowchart of an embodiment of a method according to the present disclosure.

FIG. 3 illustrates a method 50 of monitoring the brake performance of the brake system 18 of the system 10 of the present disclosure. The brake performance may be indicative of the effectiveness of the brake system 18 at slowing the machine 11 upon engagement of the brake system 18, such as the distance or time required to bring the machine 11 to a halt from a predetermined speed. The brake performance may vary throughout the lifecycle of the brake system 18, such as due to standard wear of components such as brake pads. The brake performance may be assessed substantially continuously during the normal operation of the machine 11 by the control system 20. The brake performance may be determined by the control system 20 by determining an actual deceleration (AD) and a predicted deceleration (PD) of the machine 11 during a brake engagement. In particular, the brake performance (BP) may be determined as a value:

$$BP=AD/PD$$

The operator may apply the brake system 18 via the brake input 30 at step 51. The control system 20 may initially detect a resulting brake engagement at step 52. The brake engagement or brake event may be a single instance of application of the brake system 18 to slow the machine 11. The brake engagement may be detected based upon the operating condition data from at least one of the brake input sensor 33, at least one brake system pressure sensor 34 and/or at least one wheel speed sensor 35 indicating that the brake system 18 has been engaged. The brake engagement may be detected based upon the operating condition data from a plurality of wheel speed sensors 35 in order to improve accuracy and account for instances where, for example, different axles to which each wheel is attached being operating at lower speeds due to operation of a differential in the powertrain 17. The brake engagement may also be detected based upon the operating condition data from a brake system pressure sensor 34 located in the brake system 18 at or close to the brake input 30 for detecting the application at the brake input 30 by the operator and/or from a brake system pressure sensor 34 located in the brake system 18 at or close to the at least one wheel 14, such as in fluid actuating a brake caliper or piston, for detecting the application by the brake system 18 to slow the at least one wheel 14. The control system 20 may also determine that the engine brake and/or hydraulic retarder are engaged, which would invalidate the brake performance data, the control system 20 may reject or not generate the brake performance data.

The control system 20 may determine the actual deceleration of the machine 11 during the brake engagement at step 53. The actual deceleration may be determined based upon deceleration data received at the controller 21 from the IMU 37 and/or wheel speed sensor 35 during the brake engagement.

The predicted deceleration may be determined by the control system 20 based upon at least one operating condition of the brake system 18 measured during the brake engagement and a brake map stored on the memory 22 of the control system 20. The brake map may comprise a table, graph or the like storing data for enabling the calculation of the predicted deceleration based upon the at least one brake system operating condition. The brake map may be populated from test data obtained from operating the machine 11 or a similar machine 11 during testing at a predetermined (e.g. optimum or 100%) brake performance, such as when the brake system 18 is fully serviced with unworn components. The method 50 may comprise generating the brake map from test data at step 54. The test data may indicate the braking force (BF) associated with actual measured deceleration (AMD) of the machine 11, mass (M) of the machine 11, brake system operating condition (BSOC) and a constant (k) Indicating the relationship between the brake system operating condition and the braking force:

$$BF=BSOC \times k=AMD \times M$$

The brake map may comprise a plurality of such values at a plurality of brake system operating conditions. The brake system operating condition may comprise the brake system pressure from at least one brake system pressure sensor 34 (which may be located in the brake system 18 at or close to the brake input 30 for detecting the application at the brake input 30 by the operator), the force applied to the brake pedal from the brake input sensor 33, the position of the brake pedal from the brake input sensor 33 (which may have a direct relationship with the brake system pressure) and/or the like. The brake map may provide values for a combination of different brake system operating conditions.

In order to determine the predicted deceleration the method 50 may comprise retrieving the brake map from the memory 22 at step 55. The method 50 may comprise receiving, at the control system 20, data indicative of at least one brake system operating condition during the brake engagement at step 56 and the mass at step 57. The control system 20 may determine, based upon the brake map, the braking force corresponding to the measured brake system operating condition and mass at step 58. The control system 20 may determine, based upon the output from the inclination sensor 31 (which may be the IMU 37) and the wheel speed sensor 35, the inclination θ of the machine 11 at step 59. The control system 20 may determine, at step 60, the drag forces (DF) acting on the machine 11, such as aerodynamic drag and engine friction. The drag forces may be estimated from various operating parameters measured during the brake engagement such as the machine speed, engine rotating speed and power unit output torque. As a result, predicted deceleration may be determined at step 61 based upon the brake map, at least one brake system operating condition, mass, inclination θ and drag forces as (where g is gravitational force):

$$PD=(BF/M)-(g\times\sin\theta)-(DF/M)$$

In alternative embodiments the predicted deceleration may not take into account the drag forces and/or inclination θ. Further alternatively, the predicted deceleration may instead be based upon a value provided by an operator via at least one input and/or based upon a minimum acceptable deceleration stored in the memory 22.

The control system 20 may determine the brake performance at step 62 and store the brake performance for the brake engagement as brake performance data on its memory 22 at step 63. The brake performance data may be communicated to the external computing system 26 via the network 27. If the brake performance falls below a minimum brake performance threshold an alert may be provided to the operator via the display 24, a light or the like at step 64. The control system 20 may repeat method 50 continuously by continuing to collect brake performance data for a plurality of brake engagements during the normal operation of the machine 11 and store them as brake performance data on the memory 22 for later retrieval, processing and/or display 24.

The control system 20 may determine a parasitic loss decelerating the machine 11 during the brake engagement. The parasitic loss may comprise an estimated rolling resistance and/or estimated windage losses. As a result, the control system 20 may account for additional forces acting in the deceleration of the machine 11 in addition to the brake system 18.

The control system 20 may also estimate the rolling resistance of the machine 11 during the brake engagement or just prior to the brake engagement and determine the brake performance based upon the estimated rolling resistance. The rolling resistance may comprise energy losses resulting from contact between the terrain 15 and the at least one wheel 14, such as due to deformation of the at least one wheel 14 and/or terrain 15.

The rolling resistance may be estimated based upon at least one operating condition of the machine 11 measured before the brake engagement and/or during the brake engagement. The rolling resistance may be calculated a plurality of times along a plurality of positions and/or continuously along a route of travel of the machine 11 and may be calculated using any suitable known method. The rolling resistance may be estimated based upon an estimated driving force $F_{drive}$ of the machine 11, inclination data from the inclination sensor 31 and/or from the IMU 37. The estimated driving force $F_{drive}$ may be an estimation or calculation of the force applied by the machine 11 where the at least one wheel 14 and/or track contacts the terrain 15 in order to move the machine 11. The estimated driving force $F_{drive}$ may be determined from lookup tables stored on the memory 22 based upon at least one operating condition. The estimated driving force $F_{drive}$ may be determined based upon an estimated driving torque or engine power driving the at least one wheel 14, which may be determined from the engine speed, transmission ratio, powertrain efficiency and the like, and the known radius of the at least one wheel 14.

An effective inclination $\theta_{eff}$ may be estimated based upon the estimated driving force $F_{drive}$ using:

$$F_{drive}=m\times g\times\sin\theta_{eff}$$

The effective inclination $\theta_{eff}$ may comprise the actual inclination $\theta_{act}$ of the machine 11 and an estimated rolling resistance inclination $\theta_{RR}$:

$$\theta_{eff}=\theta_{act}+\theta_{RR}$$

$\theta_{act}$ may be determined based upon the inclination data from the inclination sensor 31 and/or from the IMU 37 and the wheel speed sensor 35, and, as a result, the estimated rolling resistance inclination $\theta_{RR}$ determined. The estimated rolling resistance inclination $\theta_{RR}$ may therefore be used as an indication of the rolling resistance experienced by the machine 11.

Alternatively, the rolling resistance may be estimated from a map indicating the estimated rolling resistance of the terrain 15 across which the machine 11 travels. The map may be generated by estimating the rolling resistance as the machine 11 and other machines 11 travel over the terrain 15 prior to the brake engagement. The map may store the estimate of rolling resistance as estimated rolling resistance inclinations $\theta_{RR}$. The control system 20 may retrieve the map from its memory 22 and or via the network 27, locate the machine 11 on the map via the navigation system 32 and subsequently retrieve the corresponding rolling resistance.

The brake performance may be determined by incorporating the expected deceleration resulting from the estimated rolling resistance into the calculation of the brake performance at step 61. The estimated rolling resistance may be determined at step 70 and may be incorporated using the effective inclination $\theta_{eff}$. The result is that the predicted deceleration may be determined as follows (optionally including the drag forces):

$$PD=(BF/M)-(g\times\sin\theta_{eff})-(DF/M)$$

The brake performance may subsequently be calculated as disclosed above based upon this predicted deceleration incorporating the rolling resistance and an alert provided to an operator should the brake performance exceed a threshold value.

The control system 20 may also estimate the windage losses of the machine 11 during the brake engagement and determine the brake performance based upon the estimated windage losses. The windage losses may be in rotating components (e.g. shafts, gears, clutches) of the engine system 13 (in at least one of the powertrain 17, including axles, torque converter, transmission thereof or the power unit 16), brake system 18 or any other rotating components of the machine 11 in contact with oil. The oil may be brake cooling oil, gear lubricating oil, hydraulic oil and the like. The windage losses may comprise energy losses resulting from, for example, oil in the powertrain 17 thrown against the rotating components and/or wind generated within the powertrain 17 due to the rotation of such components. The viscosity of the oil, and therefore the temperature of the oil, may therefore affect the windage losses. In particular, during warmup of the engine system 13, the oil may increase in temperature such that the windage losses vary. Such variations may be amplified in heavier machines 11 with heavier weight oil around the rotating components. The control system 20 may account for such variations in windage losses in order to improve the accuracy of the brake performance assessment.

In particular, the control system 20 may store windage loss data on the memory 22 representing the power loss due to windage losses at a plurality of oil temperatures and a plurality of rotational speeds of the rotating components. The windage loss data may be collected by testing the rotating components at the plurality of oil temperatures and rotational speeds and determining the associated power loss.

The control system 20 may be configured to determine at least one oil temperature and at least one rotational speed of at least one rotating component during the brake engagement from at least one oil temperature sensor 39 and at least one engine system component speed sensor 40. Therefore, the control system 20 may at step 71 estimate the associated power loss based upon the at least one oil temperature, at least one rotational speed and the windage loss data. In particular, the control system 20 may estimate the power loss resulting from a plurality of rotating components by measuring each of their associated oil temperatures and rotational speeds. The resulting windage braking force (WBF) decelerating the machine 11 may be determined based upon the estimated power loss (PL), the wheel speed (WS) and the known wheel radius ($R_w$), which may be stored on the memory 22:

$$WBF=PL/(WS \times R_w)$$

The resulting deceleration (DW) due to windage losses may therefore be determined as:

$$DW=WBF/M=PL(WS \times R_w \times M)$$

The result is that the predicted deceleration may be determined as follows at step 61 (optionally including the drag forces and the rolling resistance):

$$PD=(BF/M)-(g \times \sin \theta_{\mathit{eff}})-(DF/M)-DW$$

The brake performance may subsequently be calculated as disclosed above based upon this predicted deceleration incorporating the windage losses and an alert provided to an operator should the brake performance exceed a threshold value.

The control system 20 may determine that windage loss in all or part of the powertrain 17 should not be taken into account in determining predicted deceleration when the windage loss in all or part of the powertrain 17 will not affect the deceleration. In particular, if the transmission is in neutral such that no power is transferred the control system 20 may only account for the windage loss between the decoupling point of the transmission (e.g. a clutch or torque converter) and the at least one wheel 14. Thus, if decoupling between components in the powertrain 17 is detected the control system 20 may at step 2071 estimate the associated power loss based upon the at least one oil temperature, at least one rotational speed and the windage loss data only for the at least one component of the powertrain 17 between the decoupling and the at least one wheel 14. The rest of the method may be as discussed above. Whether a decoupling has occurred may be detected by at least one powertrain speed sensor and/or other sensor for determining whether components are coupled or decoupled in the powertrain 17.

The control system 20 may also determine brake performance accounting for brake engagements in which at least one rejection condition occurs. The at least one rejection condition may be a skid in which at least one wheel 14 locks or stops rotating whilst the machine 11 continues to move along the terrain 15.

Therefore, the method 50 may comprise at step 72 detecting that a skid has occurred during the brake engagement. Skidding may be detected using any suitable method or apparatus, such as a known anti-lock braking system (ABS). Skidding may be detected based upon the output from the IMU 37 indicating that the machine 11 is decelerating and the output from the at least one wheel speed sensor 35 indicating that the wheels are not rotating during the brake engagement.

The method 50 may comprise, at step 73, rejecting brake performance data associated with the brake engagement or preventing the generation or storing of brake performance data associated with the brake engagement. The control system 20 may not process or reject the relevant operating condition data of any one of steps 53, 55, 56, 57, 58, 59, 60, 61, 64, 70, 71 to generate brake performance data associated with the brake engagement. Alternatively, the control system may not perform the step 62 of calculating the brake performance or the step 63 of storing the brake performance on the memory 22. Hence brake performance data utilised for assessing the brake performance of the brake system 18 may not comprise brake performance data for a brake engagement in which a skid occurs.

Alternatively, the control system 20 may still determine a brake performance associated with the brake engagement via method 50 but will reject the brake performance. The control system 20 may store on the memory 22 brake performance data comprising a brake performance and a rejection marker associated with the brake performance if the brake performance relates to a brake engagement in which a skid occurs. The control system 20 may disregard the brake performance with an associated rejection marker during further analysis of brake performance data related to a plurality of brake engagements.

The at least one rejection condition may also be based upon the estimated rolling resistance and/or windage losses. In a similar manner to that discussed above, the control system 20 may determine at step 72 estimating the rolling resistance and/or windage losses. At step 73 the control system 20 may reject brake performance data associated with the brake engagement or prevent the generation or storing of brake performance data associated with the brake engagement if the rolling resistance exceeds a rolling resistance threshold value and/or if the windage losses exceed a windage loss threshold value. As a result, the brake performance can be assessed taking into account where the rolling resistance or windage losses may have resulted in unreliable brake performance data.

The control system 20 may determine brake performance accounting for skids, rolling resistance and/or windage losses continuously during normal operating of the machine 11 and/or during the testing of the machine 11 to populate the brake map for calculating the braking force for use in the predicted deceleration calculations.

The control system 20 may also determine brake performance by processing the brake performance data indicating the brake performance over a plurality of brake engagements. The control system 20 may identify a brake performance event based upon a change of the brake performance between at least two brake engagements and a threshold value. If a brake performance event is identified the control system 20 may provide an alert to an operator.

Figure 4:
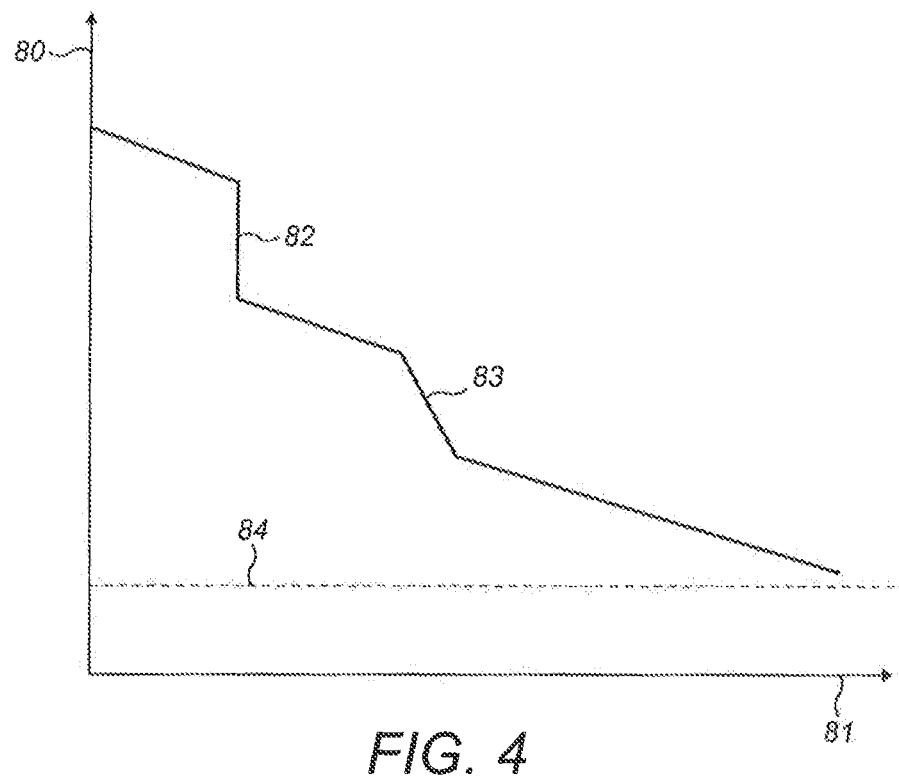
FIG. 4 is a graph illustrating brake performance against brake engagements over time.

As illustrated in FIG. 4, which is a graph of brake performance 80 against brake engagements over time 81, the control system 20 may identify a step brake performance event 82 based upon a step change in and/or a rate brake performance event 83 based upon a rate of change of the brake performance. The step and rate brake performance events 82, 83 may be identified when the brake performance are above the minimum brake performance threshold 84, below which an alert is provided to the operator.

Figure 5:
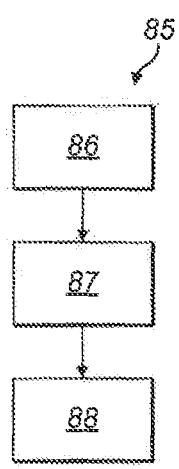
FIG. 5 is a flowchart of a further embodiment of a method according to the present disclosure.

The system 10 may perform the method 85 illustrated in FIG. 5. At step 86 the control system 20 may process the brake performance data stored on the memory 22. The control system 20 may comprise brake performance data related to at least 2, at least 5, at least 10, at least 100 or at least 1000 brake engagements. The brake performance data may be related to brake engagements during active testing in which the machine 11 is operated under known conditions (e.g. a proving grounds type test). Alternatively or additionally the brake performance data may be related to brake engagements during normal operation of the machine 11 and may take into account the drag forces, rolling resistance and/or windage losses as disclosed above.

At step 87 the control system 20 may identify in the brake performance data at least one step and/or rate brake performance event(s) 82, 83. The step brake performance event 82 may be identified by the control system 20 based upon a step change in brake performance between at least two brake engagements and a magnitude of the step change exceeding a fixed step change threshold value. The rate brake performance event 83 may be identified by the control system 20 based upon a rate of change of the brake performance between at least two brake engagements exceeding a rate of change threshold value.

The fixed step change threshold value and/or fixed rate of change threshold value may be stored in the memory 22 and may be indicative of a step change magnitude or rate of change magnitude above which an issue with the brake system 18 may have occurred. The rate of change threshold value may comprise a fixed rate of change threshold value. The rate of change threshold value may be a past rate of change threshold value based upon rates of change of brake performance during brake engagements prior to the brake performance event. For example, the past rate of change threshold value may be an average rate of change of brake performance over a plurality of prior brake engagements, such as at least 10 prior brake engagements, at least 100 prior brake engagements and at least 1000 prior brake engagements.

At step 88 the control system 20 may, in response to detecting at least one brake performance event, provide an alert to the operator. The control system 20 may therefore identify an issue with the brake system 18 before the brake performance falls below the minimum brake performance threshold 84.

The control system 20 may further monitor the brake performance by determining the brake delay of the brake system 18. The brake delay may be the system 10 response between the operator instructing the machine 11 to engage the brake system 18 and the brake system 18 engaging to decelerate the machine 11.

Figure 6:
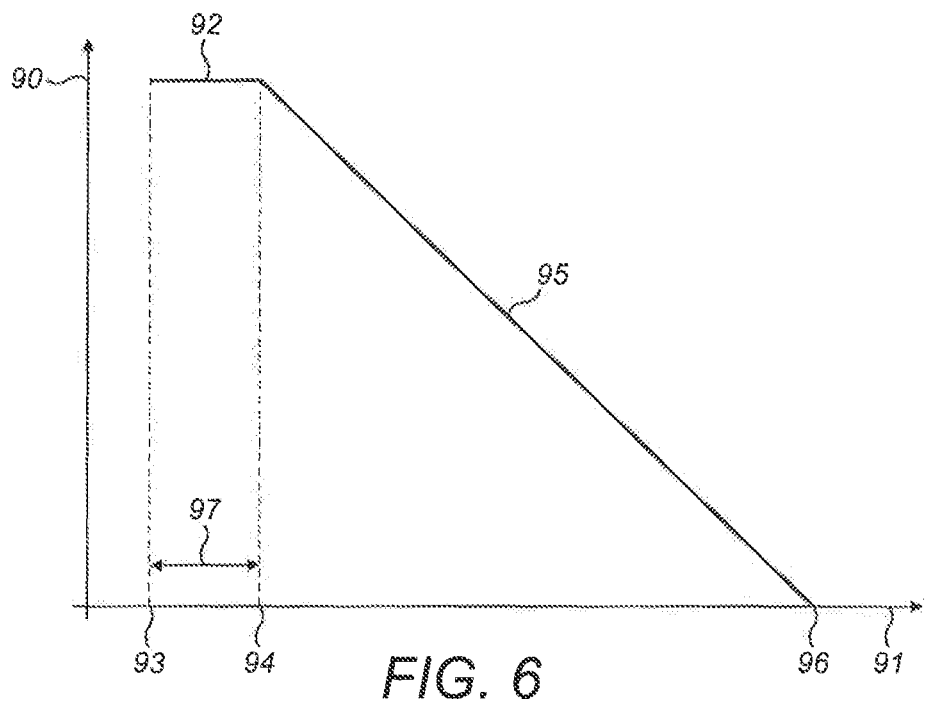
FIG. 6 is a graph illustrating a machine speed against a distance travelled during a brake engagement.

FIG. 6 illustrates a graph showing the machine speed 90 against distance 91 in which the machine speed 90 remains at a constant 92 between a first time instance 93 at which an input is provided by the operator to instruct the machine 11 and a second time instance 94 at which the brake system 18 engages. The machine 11 subsequently decelerates 95 to a halt at a third time instance 96. The brake delay may be the time period between the first and second time instances 93, 94 and the effect of the brake delay on brake performance may be the distance travelled 97 by the machine 11 during the brake delay. The control system 20 may determine the brake delay and may provide an alert when the brake delay is substantially impacting the brake performance, such as by the distance travelled exceeding a threshold distance and/or the brake delay exceeds a brake delay threshold value.

Figure 7:
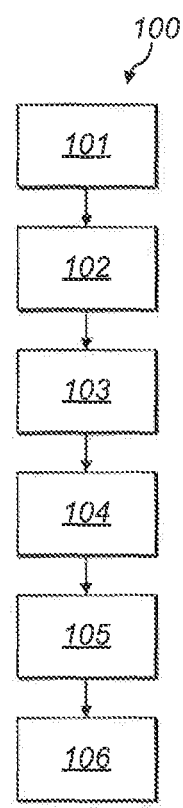
FIG. 7 is a flowchart of a further embodiment of a method according to the present disclosure.

The system 10 may therefore perform method 100 illustrated in FIG. 7. At step 101 control system 20 may detect an input via the brake input sensor 33 indicating that the operator is instructing the machine 11 to decelerate via the brake input 30. The input may be an actuation of a brake pedal and the input may be detected based upon an output from a brake pedal position sensor. At step 102 the control system 20 may operate the brake system 18, or the brake input 30 may operate the brake system 18 directly, to engage the brake system 18 in response to the input and thereby initiate a brake engagement. At step 103 the control system 20 may detect the engagement of the brake system 18 in response to the input. The engagement of the brake system 18 may be detected based upon an output from the at least one wheel speed sensor 35, such as by the output from the at least one wheel speed sensor 35 indicating that a reduction in a wheel speed has been initiated. The brake engagement may also be detected based upon the output from a brake system pressure sensor 34 located in the brake system 18 at or close to the at least one wheel 14, such as in fluid actuating a brake caliper or piston, for detecting the application by the brake system 18 to slow the at least one wheel 14.

At step 104 the control system 20 may calculate the brake delay as the time period between the detection of the input and the detection of the engagement (e.g. the start of the engagement) of the brake system 18. The brake delay may be detected based upon a clock within the controller 21. At step 105 the control system 20 may store the brake delay on the memory 22 as brake performance data, which may be in addition to brake performance data determined as disclosed above.

The control system 20 may, at step 106, operate the machine 11 based upon the brake delay. The control system 20 may provide an alert to the operator based upon the brake delay exceeding a brake delay threshold value indicative of an issue with the brake system 18 and/or control system 20. The control system 20 may also process the brake delay with the brake performance data associated with the brake engagement and identify a brake performance issue with the brake system 18 as being related to a component causing the brake delay. For example, if the brake performance falls below a threshold value, and the brake delay exceeds the brake delay threshold value, the control system 20 may determine that the brake performance issue with the brake system 18 relates to at least one component causing the brake delay.

In embodiments of the present disclosure, the brake delay is determined from an input to the braking system through to brake engagement. In a manually operated machine, the input may include depression of a brake pedal, movement of a joystick, an interaction of an operator with an interface, such as a button touch screen or the like, or another user interaction. In autonomous vehicles, the input to the braking system may comprise an input signal to the brake system. The input signal may be, for example, an electrical signal, an optical signal and/or other suitable signal.

In embodiments of the present disclosure, by defining the brake delay as commencing with the input to the brake system, the brake delay takes account of operation of the whole of the brake system. For example, with a physical input device, such as a joystick, brake pedal or the like, the joystick brake pedal may be mechanically, hydraulically or electrically coupled with the brake system and performance of this coupling is captured in the brake delay in that any delay caused by or within such a coupling is included in the measured brake delay. Where a physical input device is electronically coupled to the brake system or where the input is an electrical input, such as in an automated machine, an actuator may be necessary to couple the input to the brake system to provide for brake engagement. In such aspects, by defining the brake delay using input to the brake system, the operation of the actuator is captured, in that any delay caused by or occurring within the actuator is included in the measured brake delay. In addition, by defining the brake delay using input to the brake system, operation of communication means between the input device and the brake system, such as a hydraulic line, gas line, electronic signal communication line/system, is captured in the brake delay, in that any delay caused by or occurring within the communication means is included in the measured brake delay.

In embodiments of the present disclosure where the machine is an autonomous machine, for example an autonomous vehicle, brake delay testing may be performed periodically to monitor the brake system of the autonomous machine. During a brake test, the machine may be moved to a known brake check location. The brake test may comprise at least one brake engagement. The brake test step may comprise determining brake delay for the brake engagement or for a plurality of brake engagements. The brake delay during the one or more brake engagements may be compared to a known optimal brake delay for the system. The optimal brake delay may be determined by testing.

The brake test may comprise engaging the brakes while the machine is travelling at specified speed and/or using a specified braking force. The control system may be configured to carry out the brake test automatically. The brake test step may be carried out according to a schedule, for example after a predetermined number of brake engagements or after a predetermined elapsed time since the previous test or maintenance event.

In some embodiments, a brake test may be performed after a machine has been in use for a predetermined interval. The interval may be defined as a period of time, a predetermined number of brake engagements and or the like. In some embodiments, the brake delay may be a time-period between an input to the brake system and engagement of the brake system, where engagement of the brake system may be detected by one or more sensors monitoring, for example, a position of a brake pad or other component, deceleration of rotation of one or more wheels and/or deceleration of the machine.

By using engagement of the brake system as an end-point of the brake delay, in some embodiments of the present disclosure, it is not required to bring the machine to a complete or near complete stop during a brake test. Instead, disengagement of the brake system may be triggered as soon as brake engagement is detected, thereby reducing wear and tear on the system and the time required for the brake system test.

INDUSTRIAL APPLICATION

The method 50 may thus take rolling resistance and windage losses into account when determining the brake performance of the brake system 18. The brake performance data may therefore be a more accurate representation of the state of the brake system 18 and thereby lead to more accurate servicing and earlier identification of brake performance issues. The accuracy of brake performance data may be particularly improved if the machine 11 is an off-highway machine, which may encounter higher rolling resistances due to the variation in the type of terrain 15 (e.g. soil, sand etc) and higher windage losses due to the use of heavier oil.

The method 50 may thus take into account whether skidding occurred during the brake engagement, whether the rolling resistance exceeded a rolling resistance threshold and/or whether the windage losses exceeded a windage loss threshold value. Such events may result in the associated brake performance data being unreliable. The control system 20 may enable the assessment of brake performance without such unreliable data by rejecting it. The brake performance data for a plurality of brake engagements may thus be more reliable and, by excluding such unreliable data from test data, the brake map may be a more accurate basis for determining the predicted deceleration.

The method 85 of longer term trend analysis may enable the use of the brake performance data as a prognostic rather than only for determining maintenance intervals. In particular, brake performance issues may still occur when the brake performance are above the minimum brake performance threshold 84. The identification of brake performance events 82, 83 may provide, in addition to the minimum brake performance threshold 84, further means for identifying brake performance issues.

The method 100 of determining the brake delay may result in brake performance data that can be used to further analyse any reduction in brake performance. Therefore, the brake performance data can be used by the control system 20 and operator to identify the possible cause(s) of a reduction in brake performance.

The method 100 of determining brake delay may be of particular use in autonomous vehicles. By measuring the brake delay from the input to the brake engagement the method may take account of operation of the whole of the brake system.

The invention claimed is:

1. A method of testing a brake system of a machine comprising carrying out a method of monitoring brake performance of the brake system, the method comprising:
   detecting a brake input while the machine is travelling;
   operating the brake system to engage in response to the detection of the brake input;
   detecting a brake engagement of the brake system in response to the detection of the brake input;

determining a brake delay as a time period between the detection of the brake input and the detection of the brake engagement;

generating an alert indicative of a brake performance issue upon determining the brake delay; and triggering disengagement of the brake system upon detection of the brake engagement, wherein the machine is configured to continue travelling after the disengagement of the brake system, and wherein the machine is configured to carry out the testing of the brake system autonomously.

2. The method of claim 1, wherein the brake input is an actuation of a brake pedal and the input is detected based upon an output from a brake input sensor.

3. The method of claim 2, wherein the brake input sensor comprises a brake pedal position sensor and/or a brake system pressure sensor.

4. The method of claim 1, wherein the detection of the brake engagement is based upon an output from a wheel speed sensor.

5. The method of claim 4, wherein the detection of the brake engagement is based upon the output from the wheel speed sensor indicating that a reduction in a wheel speed has been initiated.

6. The method of claim 4, wherein the detection of the brake engagement is based upon an output from a brake system pressure sensor.

7. The method of claim 1, wherein the generating of the alert is based upon the determined brake delay exceeding a brake delay threshold value.

8. The method of claim 1, further comprising storing the determined brake delay in a memory of a control system.

9. The method of claim 1, further comprising determining brake performance data, the determining of the brake performance data comprising:

detecting an actual deceleration of the machine during the brake engagement;

determining a predicted deceleration of the machine during the brake engagement, wherein the predicted deceleration is based at least in part on at least one of an estimated rolling resistance and an estimated windage;

determining the brake performance based upon the actual and predicted decelerations;

generating the brake performance data based upon the determined brake delay and the determined brake performance; and processing the brake performance data.

10. The method of claim 9, wherein the brake performance issue is based upon the brake delay and the brake performance.

11. The method of claim 10, wherein the generating of the alert is based upon a determination that the determined brake performance is below a threshold value and a determination that the determined brake delay exceeds a brake delay threshold value.

12. The method of claim 9, wherein the determining of the predicted deceleration is based upon (1) at least one operating condition of the brake system measured during the brake engagement, and (2) a brake map.

13. The method of claim 9, wherein the determining of the actual deceleration is based upon an output from an inertial measurement unit of the machine.

14. The method of claim 1, wherein the brake input is a brake command signal.

15. The method of testing a brake system of claim 1, comprising carrying out the method of monitoring brake performance of the brake system of claim 1, for one or more brake engagements.

16. The method of testing a brake system of claim 15, wherein the alert is provided based on the brake delay and based on one or more further brake delays measured in one or more further brake engagements.

17. A system comprising:

a machine comprising a brake system; and a control system for monitoring a brake performance of the brake system, the control system being configured to:

detect a brake input;

operate the brake system to engage in response to detection of the brake input;

detect a brake engagement of the brake system in response to the detection of the brake input;

determine a brake delay as a time period between the detection of the brake input and the detection of the brake engagement;

detect an actual deceleration of the machine during the brake engagement;

determine a predicted deceleration of the machine during the brake engagement, wherein the predicted deceleration is based at least in part on at least one of an estimated rolling resistance and an estimated windage;

determine the brake performance based upon the determined actual deceleration and the determined predicted deceleration;

generate brake performance data based upon the determined brake delay and the determined brake performance;

process the brake performance data;

generate an alert indicative of a brake performance issue based upon the determined brake delay and the determined brake performance, the brake performance issue being related to a component causing the brake delay; and triggering disengagement of the brake system upon detection of the brake engagement, wherein the machine is configured to continue travelling after the disengagement of the brake system.

18. The system of claim 17, wherein the machine is an autonomous machine, and wherein the brake input is a brake command signal.

19. The system of claim 17, wherein the generating the alert is based upon a determination that the determined brake performance is below a threshold value and a determination that the determined brake delay exceeds a brake delay threshold value.

* * * * *